United States Patent
Parveen et al.

(10) Patent No.: US 11,164,223 B2
(45) Date of Patent: Nov. 2, 2021

(54) SYSTEM AND METHOD FOR ANNOTATING REVIEWS

(71) Applicant: WAL-MART STORES, INC., Bentonville, AR (US)

(72) Inventors: Tabassum Parveen, Bangalore (IN); Siddhanth Jain, Bangalore (IN); Hrushikesh Mohapatra, Bangalore (IN); Abhishek Kalai Raghavendra, Bangalore (IN)

(73) Assignee: Walmart Apollo, LLC, Bentonville, AR (US)

( * ) Notice: Subject to any disclaimer, the term of this patent is extended or adjusted under 35 U.S.C. 154(b) by 1274 days.

(21) Appl. No.: 14/846,397

(22) Filed: Sep. 4, 2015

(65) Prior Publication Data

US 2017/0068999 A1    Mar. 9, 2017

(51) Int. Cl.
*G06Q 30/02* (2012.01)

(52) U.S. Cl.
CPC ................. *G06Q 30/0282* (2013.01)

(58) Field of Classification Search
CPC .................................................. G06Q 30/0282
See application file for complete search history.

(56) References Cited

U.S. PATENT DOCUMENTS

| | | |
|---|---|---|
| 4,952,920 A | 8/1990 | Hayashi |
| 5,371,673 A | 12/1994 | Fan |
| 7,028,250 B2 | 4/2006 | Ukrainczyk et al. |
| 7,558,769 B2 | 7/2009 | Scott et al. |
| 7,620,651 B2 | 11/2009 | Chea et al. |
| 7,930,302 B2 | 4/2011 | Bandaru et al. |
| 7,937,391 B2 | 5/2011 | Chea et al. |
| 8,032,471 B2 | 10/2011 | Yahia et al. |
| 8,117,207 B2 | 2/2012 | Mushtaq et al. |
| 8,554,701 B1 * | 10/2013 | Dillard ................. G06N 99/005 706/12 |
| 8,600,796 B1 * | 12/2013 | Sterne ................ G06Q 30/0203 705/7.29 |
| 8,630,843 B2 | 1/2014 | Cai et al. |
| 8,630,845 B2 | 1/2014 | Cai et al. |
| 8,645,295 B1 | 2/2014 | Dillard |

(Continued)

OTHER PUBLICATIONS

Nithya et al, Sentiment Analysis on Unstructured Review (Year: 2014).*

(Continued)

*Primary Examiner* — Mohamed N El-Bathy
(74) *Attorney, Agent, or Firm* — Bryan Cave Leighton Paisner LLP

(57) ABSTRACT

A system and method for analyzing reviews is disclosed herein. User-generated content (UGC) such as on-line reviews of products can be broken up in to different features of the products being reviewed. The UGC is analyzed to find each mention of each feature. Then each mention is analyzed to determine a polarity of each mention. The polarities are aggregated into an overall feature score that tallies the polarity across all reviews. Such a feature score can be calculated for each feature. Thereafter, the feature scores for each feature can be displayed to the user, along with the actual UGC used to determine the feature scores. The display can be in text form or graphical. Other embodiments are also disclosed herein.

20 Claims, 14 Drawing Sheets

(56) References Cited

U.S. PATENT DOCUMENTS

| | | |
|---|---|---|
| 8,700,480 B1 | 4/2014 | Fox et al. |
| 8,818,788 B1 | 8/2014 | Mihalik et al. |
| 10,002,371 B1* | 6/2018 | Baker ................ G06Q 30/0281 |
| 2004/0078214 A1 | 4/2004 | Speiser et al. |
| 2005/0034071 A1 | 2/2005 | Musgrove et al. |
| 2005/0091038 A1 | 4/2005 | Yi et al. |
| 2005/0125216 A1 | 6/2005 | Chitrapura et al. |
| 2006/0129446 A1 | 6/2006 | Ruhl et al. |
| 2006/0200342 A1 | 9/2006 | Corston-Oliver et al. |
| 2007/0078670 A1 | 4/2007 | Dave et al. |
| 2007/0078671 A1 | 4/2007 | Dave et al. |
| 2007/0244888 A1 | 10/2007 | Chea et al. |
| 2008/0133488 A1 | 6/2008 | Bandaru et al. |
| 2008/0215571 A1 | 9/2008 | Huang et al. |
| 2008/0249764 A1 | 10/2008 | Huang et al. |
| 2008/0270116 A1 | 10/2008 | Godbole et al. |
| 2009/0182727 A1 | 7/2009 | Majko |
| 2009/0265332 A1 | 10/2009 | Mushtaq et al. |
| 2009/0287989 A1 | 11/2009 | Chakra et al. |
| 2009/0319342 A1 | 12/2009 | Shilman et al. |
| 2010/0023311 A1 | 1/2010 | Subrahmanian et al. |
| 2010/0169317 A1 | 7/2010 | Wang et al. |
| 2011/0153451 A1 | 6/2011 | Bitz et al. |
| 2012/0110438 A1 | 5/2012 | Peraza et al. |
| 2012/0209751 A1 | 8/2012 | Chen et al. |
| 2012/0245924 A1* | 9/2012 | Brun ..................... G06F 40/258 704/9 |
| 2012/0254060 A1 | 10/2012 | Choudhary et al. |
| 2013/0018892 A1* | 1/2013 | Castellanos ............ G06Q 50/01 707/748 |
| 2013/0268262 A1 | 10/2013 | Moilanen et al. |
| 2014/0207580 A1* | 7/2014 | Minnis ................... G06Q 30/02 705/14.66 |
| 2015/0066803 A1 | 3/2015 | Aneja et al. |
| 2015/0150023 A1* | 5/2015 | Johnson ................ G06F 9/4843 718/107 |
| 2015/0235243 A1* | 8/2015 | Wilson ............... G06Q 30/0203 705/7.32 |
| 2015/0286710 A1 | 10/2015 | Chang et al. |
| 2015/0324342 A1 | 11/2015 | Chin et al. |
| 2017/0068975 A1 | 3/2017 | Parveen et al. |
| 2017/0124575 A1 | 5/2017 | Clark et al. |
| 2017/0200205 A1 | 7/2017 | Liu et al. |

OTHER PUBLICATIONS

Edgar F. Codd, A Raelational Model of Data for Large Shared Data Banks, vol. 13, Jun. 1970 Jun. 1, 1970.
Alejandra L. Fernandex, Tony Veale, Prasenjit Majumder, Feature Extraction from Product Reviews using Feature Similarity and Polarity, Technical Report UCD-CSI-2009-09, Oct. 2009 Oct. 1, 2009.

* cited by examiner

400

| | Review 1 (R₁) | Review 2 (R₂) | Review 3 (R₃) |
|---|---|---|---|
| Feature 1 ($f_1$) | $S_1, S_2, S_3$ | $S_1, S_2, S_3, S_4$ | $S_1, S_2$ |
| Feature 2 ($f_2$) | $S_1$ | $S_1, S_2, S_3$ | $S_1, S_2, S_3$ |
| Feature 3 ($f_3$) | $S_1, S_2$ | $S_1$ | $S_1, S_2, S_3$ |
| Feature 4 ($f_4$) | $S_1, S_2, S_3$ | $S_1, S_2$ | |

| | Review 1 (R₁) | Review 2 (R₂) | Review 3 (R₃) |
|---|---|---|---|
| Feature 1 ($f_1$) | $S_{11}$ | $S_{12}$ | $S_{13}$ |
| Feature 2 ($f_2$) | $S_{21}$ | $S_{22}$ | $S_{23}$ |
| Feature 3 ($f_3$) | $S_{31}$ | $S_{32}$ | $S_{33}$ |
| Feature 4 ($f_4$) | $S_{41}$ | $S_{42}$ | $S_{43}$ |

| | Aggregated Feature Score |
|---|---|
| Feature 1 ($f_1$) | $F_1$ |
| Feature 2 ($f_2$) | $F_2$ |
| Feature 3 ($f_3$) | $F_3$ |
| Feature 4 ($f_4$) | $F_4$ |

FIG. 6

| | | | |
|---|---|---|---|
| 1015 — Excellent Camera | body | flash | lens |
| 1025 — Disappointed | weight | video | |
| 1035 — Very Satisfied | flash | lens | |
| 1045 — Slow shipping | body | | |

SYSTEM AND METHOD FOR ANNOTATING REVIEWS

TECHNICAL FIELD

This disclosure relates generally to reviews, and relates more particularly to a system and method for more thoroughly analyzing reviews.

BACKGROUND

There are many sites available on the Internet that allow a user to access reviews of products. However, these reviews can sometimes be misleading, especially if the reviews rely on an overall score of a product. Because some reviews might be negative for reasons that are not relevant to all users, it would be desirable to have a method and system for analyzing reviews based on features of a product.

BRIEF DESCRIPTION OF THE DRAWINGS

To facilitate further description of the embodiments, the following drawings are provided in which:

FIG. 4 illustrates a table of reviews and features, according to an embodiment;

FIG. 5 illustrates a table of reviews and features, according to an embodiment;

FIG. 6 illustrates a table of reviews and features, according to an embodiment;

FIG. 10 illustrates an exemplary screen shot according to an embodiment;

Figure 1:
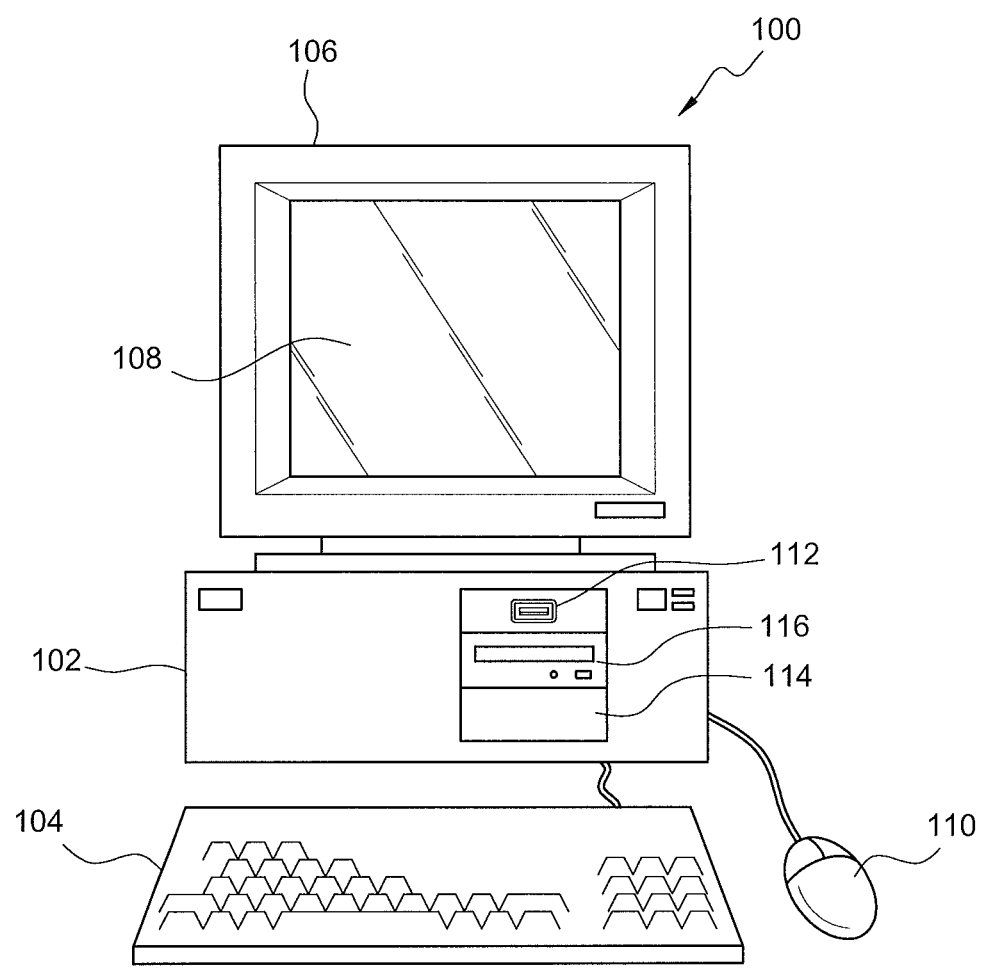
FIG. 1 illustrates a front elevation view of a computer system that is suitable for implementing an embodiment of the system disclosed in FIG. 3.

For simplicity and clarity of illustration, the drawing figures illustrate the general manner of construction, and descriptions and details of well-known features and techniques might be omitted to avoid unnecessarily obscuring the present disclosure. Additionally, elements in the drawing figures are not necessarily drawn to scale. For example, the dimensions of some of the elements in the figures might be exaggerated relative to other elements to help improve understanding of embodiments of the present disclosure. The same reference numerals in different figures denote the same elements.

The terms "first," "second," "third," "fourth," and the like in the description and in the claims, if any, are used for distinguishing between similar elements and not necessarily for describing a particular sequential or chronological order. It is to be understood that the terms so used are interchangeable under appropriate circumstances such that the embodiments described herein are, for example, capable of operation in sequences other than those illustrated or otherwise described herein. Furthermore, the terms "include," and "have," and any variations thereof are intended to cover a non-exclusive inclusion, such that a process, method, system, article, device, or apparatus that comprises a list of elements is not necessarily limited to those elements, but might include other elements not expressly listed or inherent to such process, method, system, article, device, or apparatus.

The terms "left," "right," "front," "back," "top," "bottom," "over," "under," and the like in the description and in the claims, if any, are used for descriptive purposes and not necessarily for describing permanent relative positions. It is to be understood that the terms so used are interchangeable under appropriate circumstances such that the embodiments of the apparatus, methods, and/or articles of manufacture described herein are, for example, capable of operation in other orientations than those illustrated or otherwise described herein.

The terms "couple," "coupled," "couples," "coupling," and the like should be broadly understood and refer to connecting two or more elements mechanically and/or otherwise. Two or more electrical elements might be electrically coupled together, but not be mechanically or otherwise coupled together. Coupling might be for any length of time, e.g., permanent or semi-permanent or only for an instant. "Electrical coupling" and the like should be broadly understood and include electrical coupling of all types. The absence of the word "removably," "removable," and the like near the word "coupled," and the like does not mean that the coupling, etc. in question is or is not removable.

As defined herein, two or more elements are "integral" if they are comprised of the same piece of material. As defined herein, two or more elements are "non-integral" if each is comprised of a different piece of material.

As defined herein, "approximately" can, in some embodiments, mean within plus or minus ten percent of the stated value. In other embodiments, "approximately" can mean within plus or minus five percent of the stated value. In further embodiments, "approximately" can mean within plus or minus three percent of the stated value. In yet other embodiments, "approximately" can mean within plus or minus one percent of the stated value.

DESCRIPTION OF EXAMPLES OF EMBODIMENTS

In one embodiment, a method can comprise: producing a feature set by creating a list of features for a product; analyzing user-generated content to find one or more mentions of each feature of the feature set; analyzing each of the one or more mentions of each feature of the feature set to determine a total polarity of each of the one or more mentions; calculating a feature score using the total polarity of each feature of the feature set; and displaying the feature score of each feature to a user.

In one embodiment, a system can comprise: one or more processing modules; and one or more non-transitory storage modules storing computing instructions configured to run on the one or more processing modules and perform the acts of: producing a feature set by creating a list of a features for a product; analyzing user-generated content to find one or more mentions of each feature of the feature set; analyzing each of the one or more mentions of each feature of the feature set to determine a total polarity of each of the one or more mentions; calculating a feature score using the total polarity of each feature of the feature set; and displaying the feature score of each feature to a user.

In one embodiment, a method can comprise: analyzing one or more reviews in a set of reviews to determine a set of features; matching the set of features with the set of reviews to create an annotated set of reviews, wherein each review is matched with one or more annotations; for each annotation in each review in the annotated set of reviews, marking the annotation as positive for a feature if a feature score is greater than a first predetermined score; for each annotation in each review in the annotated set of reviews, marking the annotation as negative for a feature if a feature score is less than a second predetermined score; and transmitting for display one or more reviews of the annotated set of reviews; wherein: each of the features of the set of features represents a different aspect of a product being reviewed; and the feature score of a feature is calculated by determining a total polarity of reviews.

In one embodiment, a system can comprise: one or more processing modules; and one or more non-transitory storage modules storing computing instructions configured to run on the one or more processing modules and perform the acts of analyzing one or more reviews in a set of reviews to determine a set of features; matching the set of features with the set of reviews to create an annotated set of reviews, wherein each review is matched with one or more annotations; for each annotation in each review in the annotated set of reviews, marking the annotation as positive for a feature if a feature score is greater than a first predetermined score; for each annotation in each review in the annotated set of reviews, marking the annotation as negative for a feature if a feature score is less than a second predetermined score; and transmitting for display one or more reviews of the annotated set of reviews; wherein: each of the features of the set of features represents a different aspect of a product being reviewed; and the feature score of a feature is calculated by determining a total polarity of reviews.

In one embodiment a method can comprise: analyzing one or more reviews in a set of reviews to determine a set of features analyzed in the set of reviews; for each review in the set of reviews, noting each feature of the set of features analyzed in the review; receiving a request from a user indicating a desire to view a selected feature in the set of features; determining which reviews in the set of reviews are noted with the selected feature and placing those reviews in a subset of reviews; and transmitting for display a summary of the subset of reviews.

Figure 2:
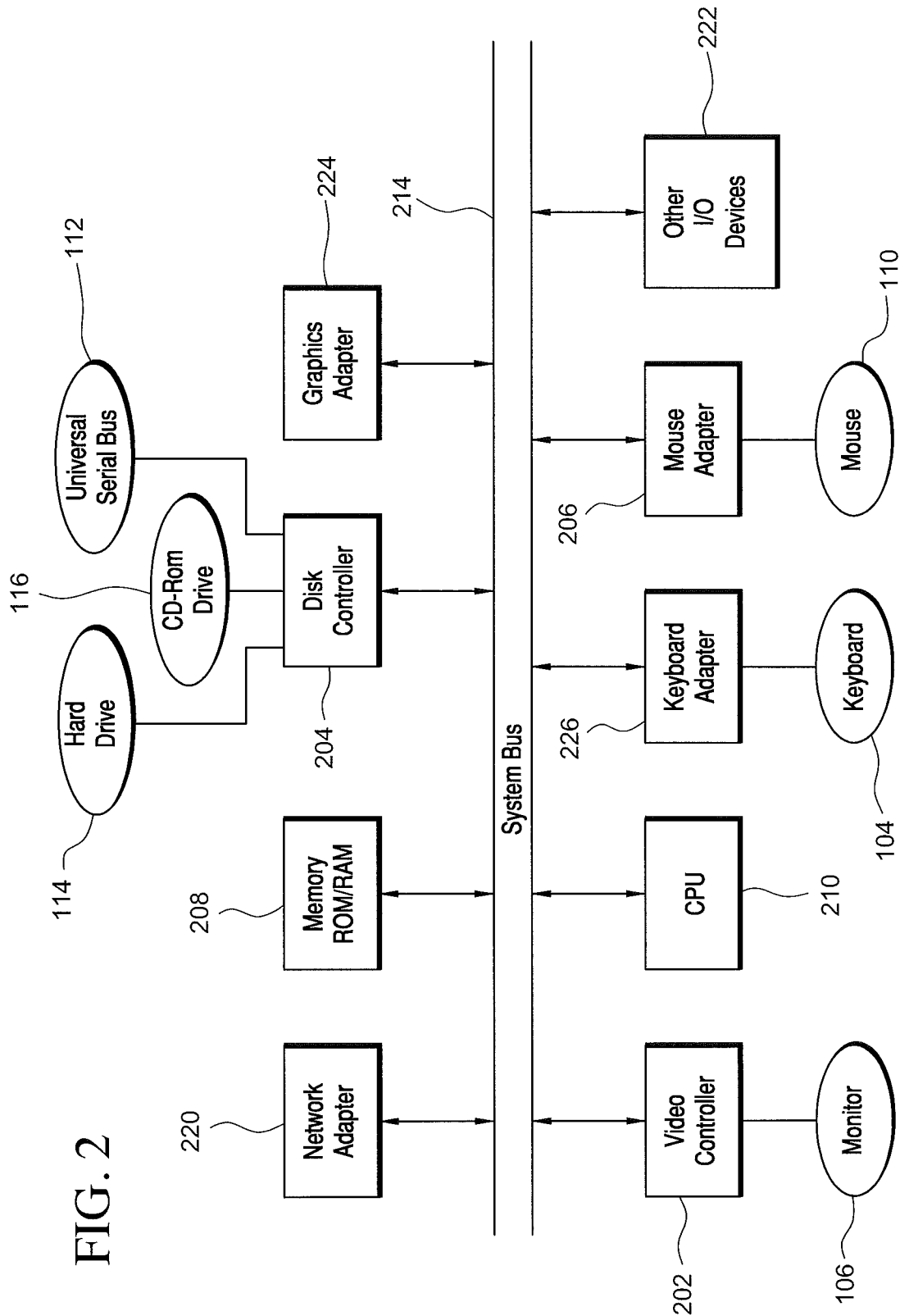
FIG. 2 illustrates a representative block diagram of an example of the elements included in the circuit boards inside a chassis of the computer system of FIG. 1.

In one embodiment, a system can comprise: a user input device; a display device; one or more processing modules; and one or more non-transitory storage modules storing computing instructions configured to run on the one or more processing modules and perform the acts of analyzing one or more reviews in a set of reviews to determine a set of features analyzed in the set of reviews; for each review in the set of reviews, noting each feature of the set of features analyzed in the review; receiving a request from a user indicating a desire to view a selected feature in the set of features; determining which reviews in the set of reviews are noted with the selected feature and placing those reviews in a subset of reviews; and transmitting for display a summary of the subset of reviews Turning to the drawings, FIG. 1 illustrates an exemplary embodiment of a computer system 100, all of which or a portion of which can be suitable for implementing the techniques described herein. As an example, a different or separate one of a chassis 102 (and its internal components) can be suitable for implementing the techniques described herein. Furthermore, one or more elements of computer system 100 (e.g., a refreshing monitor 106, a keyboard 104, and/or a mouse 110, etc.) can also be appropriate for implementing the techniques described herein. Computer system 100 comprises chassis 102 containing one or more circuit boards (not shown), a Universal Serial Bus (USB) port 112, a Compact Disc Read-Only Memory (CD-ROM), Digital Video Disc (DVD) drive, or Blu-Ray drive 116, and a hard drive 114. A representative block diagram of the elements included on the circuit boards inside chassis 102 is shown in FIG. 2. A central processing unit (CPU) 210 in FIG. 2 is coupled to a system bus 214 in FIG. 2. In various embodiments, the architecture of CPU 210 can be compliant with any of a variety of commercially distributed architecture families.

Continuing with FIG. 2, system bus 214 also is coupled to a memory storage unit 208, where memory storage unit 208 comprises both read only memory (ROM) and random access memory (RAM). Non-volatile portions of memory storage unit 208 or the ROM can be encoded with a boot code sequence suitable for restoring computer system 100 (FIG. 1) to a functional state after a system reset. In addition, memory storage unit 208 can comprise microcode such as a Basic Input-Output System (BIOS) or Unified Extensible Firmware Interface (UEFI). In some examples, the one or more memory storage units of the various embodiments disclosed herein can comprise memory storage unit 208, a USB-equipped electronic device, such as, an external memory storage unit (not shown) coupled to universal serial bus (USB) port 112 (FIGS. 1-2), hard drive 114 (FIGS. 1-2), and/or CD-ROM, DVD drive, or Blu-Ray drive 116 (FIGS. 1-2). In the same or different examples, the one or more memory storage units of the various embodiments disclosed herein can comprise an operating system, which can be a software program that manages the hardware and software resources of a computer and/or a computer network. The operating system can perform basic tasks such as, for example, controlling and allocating memory, prioritizing the processing of instructions, controlling input and output devices, facilitating networking, and managing files. Some examples of common operating systems can comprise various versions/distributions of Microsoft® Windows® operating system (OS), Apple® OS X, UNIX® OS, and Linux® OS.

As used herein, "processor" and/or "processing module" means any type of computational circuit, such as but not limited to a microprocessor, a microcontroller, a controller, a complex instruction set computing (CISC) microprocessor, a reduced instruction set computing (RISC) microprocessor, a very long instruction word (VLIW) microprocessor, a graphics processor, a digital signal processor, or any other type of processor or processing circuit capable of performing the desired functions. In some examples, the one or more processors of the various embodiments disclosed herein can comprise CPU 210.

In the depicted embodiment of FIG. 2, various I/O devices such as a disk controller 204, a graphics adapter 224, a video controller 202, a keyboard adapter 226, a mouse adapter 206, a network adapter 220, and other I/O devices 222 can be coupled to system bus 214. Keyboard adapter 226 and mouse adapter 206 are coupled to keyboard 104 (FIGS. 1-2) and mouse 110 (FIGS. 1-2), respectively, of computer system 100 (FIG. 1). While graphics adapter 224 and video controller 202 are indicated as distinct units in FIG. 2, video controller 202 can be integrated into graphics adapter 224, or vice versa in other embodiments. Video controller 202 is suitable for refreshing monitor 106 (FIGS. 1-2) to display images on a screen 108 (FIG. 1) of computer system 100 (FIG. 1). Disk controller 204 can control hard drive 114 (FIGS. 1-2), USB port 112 (FIGS. 1-2), and CD-ROM drive 116 (FIGS. 1-2). In other embodiments, distinct units can be used to control each of these devices separately.

In some embodiments, network adapter 220 can comprise and/or be implemented as a WNIC (wireless network interface controller) card (not shown) plugged or coupled to an expansion port (not shown) in computer system 100 (FIG. 1). In other embodiments, the WNIC card can be a wireless network card built into computer system 100 (FIG. 1). A wireless network adapter can be built into computer system 100 by having wireless communication capabilities integrated into the motherboard chipset (not shown), or implemented via one or more dedicated wireless communication chips (not shown), connected through a PCI (peripheral component interconnector) or a PCI express bus of computer system 100 (FIG. 1) or USB port 112 (FIG. 1). In other embodiments, network adapter 220 can comprise and/or be implemented as a wired network interface controller card (not shown).

Although many other components of computer system 100 (FIG. 1) are not shown, such components and their interconnection are well known to those of ordinary skill in the art. Accordingly, further details concerning the construction and composition of computer system 100 and the circuit boards inside chassis 102 (FIG. 1) are not discussed herein.

When computer system 100 in FIG. 1 is running, program instructions stored on a USB-equipped electronic device connected to USB port 112, on a CD-ROM or DVD in CD-ROM and/or DVD drive 116, on hard drive 114, or in memory storage unit 208 (FIG. 2) are executed by CPU 210 (FIG. 2). A portion of the program instructions, stored on these devices, can be suitable for carrying out at least part of the techniques described herein.

Although computer system 100 is illustrated as a desktop computer in FIG. 1, there can be examples where computer system 100 can take a different form factor while still having functional elements similar to those described for computer system 100. In some embodiments, computer system 100 can comprise a single computer, a single server, or a cluster or collection of computers or servers, or a cloud of computers or servers. Typically, a cluster or collection of servers can be used when the demand on computer system 100 exceeds the reasonable capability of a single server or computer. In certain embodiments, computer system 100 can comprise a portable computer, such as a laptop computer. In certain other embodiments, computer system 100 can comprise a mobile device, such as a smart phone or a tablet. In certain additional embodiments, computer system 100 can comprise an embedded system. It should also be understood that a particular configuration of computer system 100 might or might not contain each of the items shown in FIG. 1 or 2 or might contain multiple of each of the items shown in FIG. 1 or 2. For example, certain implementations of computer system 100 might not contain a CD-ROM, DVD, or Blu-Ray drive 116. Other implementations of computer system 100 might contain two CD-ROM, DVD, or Blu-Ray drives 116. Other implementations of computer system 100 can contain 2 or more monitors 106. Other implementations of computer system 100 could contain no monitors. Other implementations of computer system 100 can contain equivalents to certain items. For example, hard drive 114 can be replaced or augmented by a solid-state drive (SSD).

The Internet gives users the ability to research any product or service that the user wishes to purchase to a much greater extent than possible before the Internet. For example, users can go to an eCommerce website, search for a product or service, and analyze the opinions of many different people regarding the product or service. This ability can be particularly useful for users who are comparing two competing products or services.

One problem with existing reviews is that user generated content ("UGC") (including, but not limited to, reviews at eCommerce sites, blog entries, on-line articles, and the like) often includes a rating system (such as a star system featuring from 1 to 5 stars to rate a product), but the ratings might not accurately reflect a user's actual views of a product. For example, a user might give a low rating for a product, but the low rating is solely clue to a slower delivery than expected (thus becoming a review of the eCommerce vendor as opposed to the product). Another review might give a low rating on a product for reasons that might not be important to other users. For example, one review of a smartphone could give a low rating for a particular smartphone primarily because of poor camera capabilities. But another user might not care about camera capabilities because she is not interested in photos.

Another example might involve a more thorough review that analyzes several different aspects of a product and assigns an overall rating of the product. However, some users might be particularly interested in some aspects of the review, but not other aspects of the review. For example, some users might not care how comfortable the back seat of a car is because they do not plan to use the back seat on a regular basis. So a review of a car that is otherwise positive, but gives an overall neutral or negative review to a car because of a small back seat, might not be relevant to some users.

While it can be useful to analyze reviews and determine an overall sentiment of a review, it can be more insightful to determine a specific sentiment of each aspect of a review, to provide a user with more information when making a decision.

As of today, if a user wants to compare two similar products, his/her only choices is either to make use of the overall scores provided by eCommerce sites or by reading through each review and noting what each reviewer has written. It should be clear that just making use of the overall score might not be a great deal of help because a single overall score might not give a detailed explanation as to why one product is better than or worse than another. On the other hand, reading through each review can become a very time consuming activity (e.g., on some eCommerce sites, popular products can have tens of thousands of reviews).

In actual usage, more than the overall rating of a product, users are interested in individual aspects of products. For example, when comparing two cameras, a user might want to compare not only the overall rating of each product, but also individual features of each product, such as body, lens, focal lengths, zoom, and the like.

Sentiment analysis can be used to provide an automated method to analyze reviews. However, sentiment analysis is mostly limited to the overall sentiment projected by the entire text. Therefore, for any product, there is no existing automated system that groups features of the product with the sentiment expressed specifically with regard to that feature. The representations that come closest to this ideal are the review systems of many e-commerce sites that provide overall ratings for a product based on entire reviews given by the user. These overall ratings usually range from one to five stars for the product, and these overall ratings are explicitly added by the reviewer. Typically, there is no way to generate an overall rating from the text of a review. For the above and other reasons, overall ratings can present a flawed insight to the overall likeability of a product.

One solution is to provide the user with not only an overall rating for the product, but also the underlying features along with a corresponding score for each feature. Unlike the existing systems mentioned above, an embodiment can apply sentiment analysis to the text to arrive at a score for each of its features. Some embodiments have the capability to concentrate on only the relevant content from a review for every such feature and derive a rating for it. These embodiments provide a better representation and a deeper insight to the product from the data available. With the addition of a feature score, an embodiment can be more informative than an overall one-star to five-star rating system that is prevalent in today's rating systems.

Figure 3:
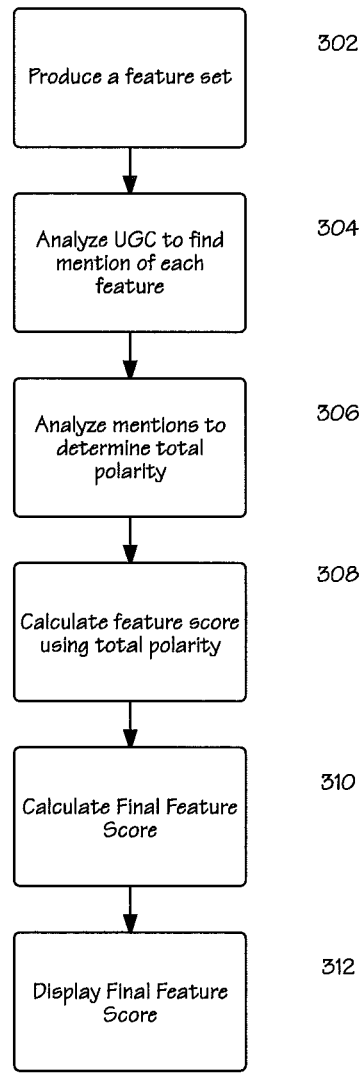
FIG. 3 illustrates a flowchart for an exemplary method of calculating a feature score, according to an embodiment.

Turning ahead in the drawings, FIG. 3 is a flowchart illustrating a method 300 for calculating a feature score. The search being performed can be performed on a computer system 100 (FIG. 1). Method 300 is merely exemplary and is not limited to the embodiments presented herein. Method 300 can be employed in many different embodiments or examples not specifically depicted or described herein. In some embodiments, the procedures, the processes and/or the activities of method 300 can be performed in the order presented. In other embodiments, the procedures, the processes, and/or the activities of method 300 can be performed in any other suitable order. In still other embodiments, one or more of the procedures, the processes, and/or the activities of method 300 can be combined or skipped.

For each product being analyzed, a feature set for the product is produced (block 302). The feature set will be the set of attributes for which the analysis will be done. There can be several manners in which a feature set can be created. In some embodiments, the specifications can be analyzed, and the most important attributes mentioned in its specifications can be added to the feature set. In some embodiments, the feature set of a competing product can be analyzed to produce a feature set for the product being analyzed. In some embodiments, other methods can be used such as, for example, a single scan of all the reviews can be executed to obtain a list of relevant features on the basis of term-frequency.

From this initial feature set, synonyms and related words for each feature can be added to the feature set. It should be understood that this technique is not limited to synonyms. For example, some reviews might refer to the "weight" of a product while others might refer to the "mass" of a product. Related words can be more encompassing than just synonyms. Referring to the same example of weight/mass, some reviews might refer to a product as "light," and other reviews might refer to the same product as "heavy," sometimes without even using the terms "weight" or "mass." The use of modifiers also can be taken into account. For example, the phrases "not heavy" and "very heavy" should be analyzed very differently. Terms such as the above can be added to the feature set as terms to be analyzed.

The result is a feature set: $f_1, f_2, \ldots, f_m$.

An exemplary feature set for a camera might be (body, lens, zoom, flash, screen battery, focus, weight, face-detection, pixels, etc.)

Thereafter, for every feature in the feature set, the user-generated content ("UGC") is analyzed to find mentions of each feature (block 304). Thereafter, each of the mentions can be analyzed to determine polarity of each mention (block 306). Any known semantic analysis tool can be used to perform this analysis. In one embodiment, Alchemy API can be used to perform this analysis. Normalizing the total polarity in terms of number of occurrences provides the feature score for the feature in that review. Additionally, the number of occurrences can be an indication of the importance of the feature in the review.

The following is an example of how the polarity can be determined.

There is a set of reviews: $R_1, R_2, R_3, \ldots, R_n$

For a feature $f_i$ in the feature set, the number of occurrences in review $R_j$ is $n_{ij}$.

For every mention k of feature $f_i$ in review $R_j$, we get a polarity of the sentiment expressed in that occurrence=$s_k$.

The total polarity of the feature $f_i$ in review $R_j$ is given by the following formula:

$$\text{Total polarity}(f_i, R_j) = \Sigma_{k=1}^{n_{ij}} s_k$$

Example: Here is an exemplary camera review $R_1$:

"Many people write reviews right after they get a product so they don't always note when something goes wrong down the line. I have had my Canon 7D now for well over a year and can happily report that it is by far the best camera I have ever owned (and I have had many)! It has never had a single problem, the battery seems to last forever (seriously, I use it daily and I think I charge it once every month or two, after thousands of shots), and the images are spectacular. I have a number of Canon lenses including the 24-105 L/f4 that I use most as well as a 50 mm/f1.4 and the incredible 100 mm macro lens from Canon. I also have a wide angle lens that I use hardly ever. I am a semi-pro and have been shooting since high school (about 25 years now). I photograph nature most often (as well as my immediate family on a daily basis, including a squirmy toddler). It works very well as a point and shoot as well so I can hand it to my daughter on all automatic settings and she gets superb photographs out of it every time. I shoot mostly on A-priority or manual. The controls are very intuitive (my 12-year old has no problems figuring everything out). I download my photos into Lightroom and catalog/edit there. It is very easy to manage my thousands of photos this way. I cannot recommend this camera or the Canon L lenses highly enough! Worth every penny."

For the feature $f_1$, lens, the sentences that will be considered are the ones that are underlined above. The number of occurrences in review $R_1$ for feature $f_1$ is $n_{ij}=3$. A sentiment analysis for each of these sentences is performed. The polarity can be recorded as $s_1$, $s_2$, and $s_3$. A sentiment analysis system can assign each of these polarities between −1 and 1, depending on the content of the sentence. The scale used for polarities, however, can range between any two numbers. Thus, in some embodiments, the polarity can be between −1 and 1. In other embodiments, the polarity can be between 0 and 10. In other embodiments, the polarity can be between 0 and 100. An embodiment can readily convert from one polarity scale to a different polarity scale through the use of addition, subtraction, multiplication, division, and the like.

With reference to FIG. 4, a table 400 is presented that illustrates an exemplary case with multiple reviews and features. Each of columns 410, 420, and 430 represent different reviews. Each of rows 415, 425, 435, and 445 represents different features of the product being reviewed. The intersection of each row and column represents each feature in each review. At the intersection of each row and column is one or more polarities $s_i$. There can be multiple polarities representing each mention of a particular feature in a particular review. For example, in the review presented above, there can be three different polarities, one for each sentence that mentions a lens.

The table presented in FIG. 4 is merely exemplary. In actual use, there will likely be many more than three reviews and more than four features. In addition, a similar table can exist for each product in a particular database. Some databases contain thousands or even millions of products (for example, the databases of large eCommerce providers).

Returning to FIG. 3, the scores over all occurrences of a feature are normalized to obtain feature score $S_{ij}$ (block 308).

An exemplary formula to calculate a feature score is as follows:

$$\text{feature score } (f_i, R_j) = S_{ij} = \frac{\left(\sum_{k=1}^{n_{ij}} s_k\right)}{n_{ij}}$$

Hence, for every feature/review pair, a feature score $S_{ij}$ is obtained such that $(-1) <= S_{ij} <= 1$. Therefore, after normalization, the table of FIG. 5 is the result.

With reference to FIG. 5, a table 500 is presented that illustrates an exemplary case with multiple reviews and features. The table presented in FIG. 5 is merely exemplary. In actual use, there will likely be many more than three reviews and many more than four features. In addition, a similar table can exist for each product in a particular database. Some databases contain thousands or even millions of products (for example, the databases of large eCommerce providers).

Each of columns 510, 520, and 530 represent different reviews. Each of rows 515, 525, 535, and 545 represents different features of the product being reviewed. The intersection of each row and column represents each feature in each review. The feature score is calculated in a manner such as that presented above.

It can be illustrative to compare FIG. 4 and FIG. 5. Here, it can be assumed that FIG. 5 is a different representation of the data from FIG. 4. For example, with reference to FIG. 4, feature 1 of review 1 had three different polarities. With reference to FIG. 5, the three different polarities of feature 1 of review 1 have been combined to form a feature score for that review.

An embodiment can access table 500, aggregate all the scores for a feature, and normalize the scores by the number of reviews to obtain the final feature score. Returning to FIG. 3, the aggregation of scores can be represented by block 310. Thereafter, the feature score can be displayed to a user (block 312).

After a user has read all the reviews he desires to make a decision, an embodiment can be configured to receive an order that purchases a product (block 314). Thereafter, an embodiment can be configured to facilitate the delivery of the product to the user (block 316). Such a facilitation can be accomplished in one of a variety of ways known in the art or developed in the future. In some embodiments, the information from the order can be sent to a fulfillment center which will perform delivery services. In other embodiments, the information can be sent to a brick and mortar store, which can place the product in a special area for pick-up at a later time by the user.

In other words, each of the feature scores can be averaged across every review or across every mention in every review. An exemplary result of this technique is shown as table 600 in FIG. 6. In table 600, column 610 is the only column and represents the aggregate feature score. Rows 615, 625, 635, and 645 are each of the features.

The table presented in FIG. 6 is merely exemplary. In actual use, there can be more than four features. In addition, a similar table can exist for each product in a particular database. Some databases contain thousands or even millions of products (for example, the databases of large eCommerce providers).

After calculating the aggregated feature scores across all the reviews, it can be desirable to display the feature scores in a manner that would be useful to the users. In one embodiment, there is a new layout to showcase different aspects/features of an entity. One use case of an embodiment can be in eCommerce web sites. However, the design discussed in the following paragraphs can be generalized and applied to other types of usage also.

After the above embodiment is performed, an embodiment now has a score of every feature for each review. If the score $s_{ij}$ is above a threshold (e.g., zero), then the feature $f_i$ can be determined to be a "good" feature based on the review $R_j$. Similarly, if the score $s_{ij}$ is below a threshold (e.g., 0), then the feature $f_i$ can be determined to be a "bad" feature based on the review $R_j$. The threshold between a "good" feature and a "bad" feature can be different from that described above. In an embodiment where the threshold is 0 for both good features and bad features, the feature score can be only good or be bad (except for the unusual case of a feature score being exactly 0). In some embodiments, the threshold scores can be set such that there are some features that are neither good nor bad. For example, the threshold for being considered a "good" feature can be above 0.5. The threshold for being considered a "bad" feature can be negative 0.5. Thus, there would be some features that are good, some features that are bad, and some features that are neutral (i.e., neither "good" nor "bad"). In some embodiments, the threshold for being considered "good" or "bad" can be adjusted by a user.

In some embodiments, as part of block 312, all feature scores can be displayed to a user. In some embodiments, only "good" feature scores can be displayed to a user. In some embodiments, only "bad" feature scores can be displayed to a user. In some embodiments, both "good" and "bad" feature scores can be displayed to a user. Such a task can be accomplished in a number of different manners. In some embodiments, a first threshold score is established. The feature score for each feature of a product is compared to the first threshold score. Thereafter, only feature scores greater than the first threshold score are displayed. In a similar manner, a second threshold score can be established. Thereafter, only feature scores lower than the second threshold score are displayed.

Establishing the first or second threshold score can occur in a number of different manners. In some embodiments, the first or second threshold score can be pre-determined. In some embodiments, the first or second threshold scores can be set by a user. In some embodiments, setting a threshold score can be accomplished by using a drop down box on a web page. In some embodiments, setting a threshold score can be accomplished by using a filter. Other methods of setting a threshold score can be used.

As described above, there can be several negatives to the current trend of using a single score to represent a user's opinion of a product. In some embodiments, after calculating the various scores for each feature, it can be desirable to display the scores to a user in a manner to allow a user to more accurately evaluate a product.

Figure 7:
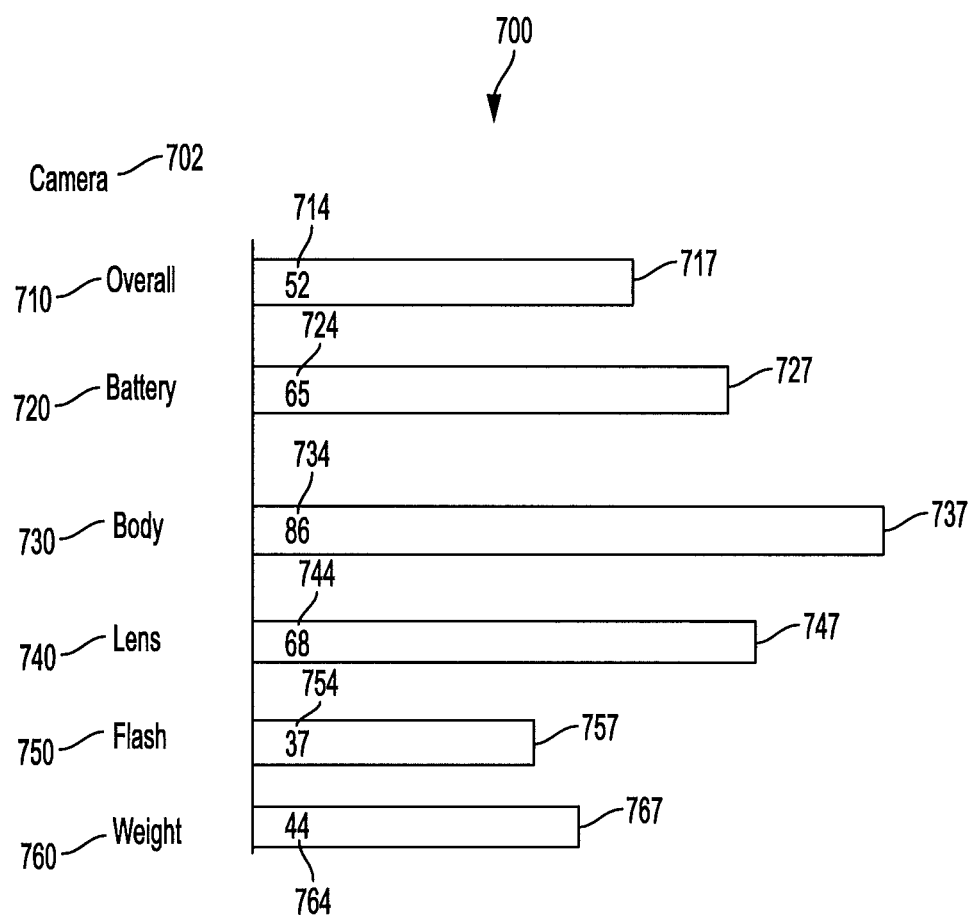
FIG. 7 is an exemplary screen shot illustrating the presentation of feature scores.

Moving ahead to FIG. 7, an exemplary screen shot 700 illustrating the presentation of feature scores is presented. FIG. 7 is merely exemplary and embodiments of the screen representation and menu system are not limited to the embodiments presented herein. The screen representation and menu system can be employed in many different embodiments or examples not specifically depicted or described herein. As an example, screen shot 700 can be shown on a screen of refreshing monitor 106 (FIG. 1).

Returning to FIG. 7, at the top of exemplary screen shot 700 is name 702 of the product for which the review scores are applicable. It should be understood that while only the name of the product is shown in screen shot 700, additional information might also be present in various embodiments. For example, a photo of the product, a brief description of the product, the manufacturer of the product, and other relevant information might be listed. It should also be understood that, while the example here pertains to a camera and various features of a camera, embodiments can be used on products of any type. In addition, embodiments are not limited to products, as embodiments can be used to rate services (such as restaurants, auto repair shops, hair salons, and the like) as well.

Underneath name 702 is a list of various features. In the example presented in FIG. 7, features include features 710, 720, 730, 740, 750, and 760. Each of the features is listed next to a feature score, such as scores 714, 724, 734, 744, 754, and 764. Scores 714, 724, 734, 744, 754, and 764 are shown in numerical form in FIG. 7. Some embodiments might also include a graphical representation of the feature score. In FIG. 7, such graphical representations can include bar graphs 717, 727, 737, 747, 757, and 767. It should be understood that the graphical representation is not limited to a bar graph and can take a variety of different formats.

Screen shot 700 can be displayed to a user at various times and in various manners. For example, a user might enter an eCommerce site and type in a search term for a camera. The result could include the layout of FIG. 7 for multiple cameras at once. In such a manner, a user can easily compare different features among different cameras. For example, in FIG. 7, flash has a relatively low score of 37. So some users might view that negatively and decide to purchase a different camera with a higher score for flash. But a different set of users might not be interested in flash performance and might be intrigued by the relatively high body score of 86.

There are other aspects that a user can adjust. For example, in some embodiments, the feature scores can be hidden, except the overall score. The result would be similar to many eCommerce sites today, with only an overall score being presented. However, with the selection of an option (such as a drop box, check box, radio button, and the like), additional feature scores can be presented to the user.

Such a layout can be beneficial in improving customer satisfaction. As opposed to a large amount of clutter that is currently present over most customer review portals, an embodiment can serve as a one-stop solution. Such a solution can help in retaining and attracting new customers.

Figure 8:
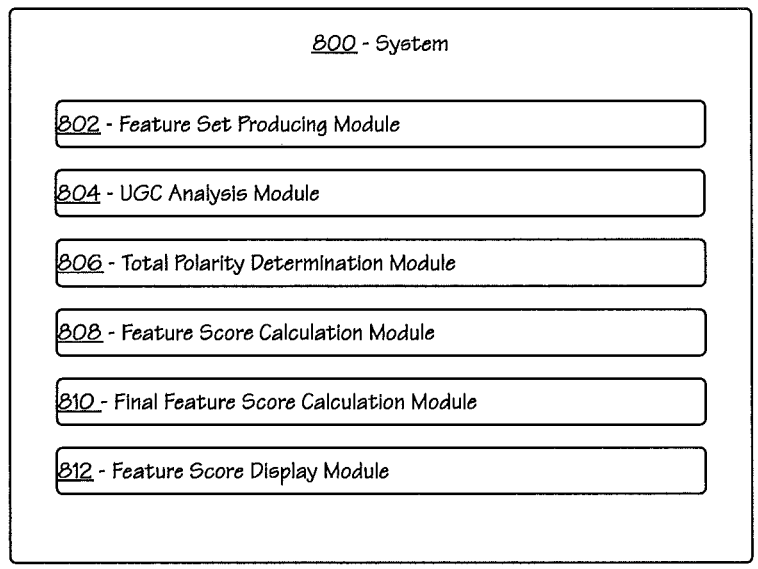
FIG. 8 is a block diagram of a system arranged to perform various tasks according to an embodiment.

Turning ahead in the figures, FIG. 8 illustrates a block diagram of a system 800 arranged to perform various tasks. System 800 is merely exemplary and is not limited to the embodiments presented herein. System 800 can be employed in many different embodiments or examples not specifically depicted or described herein. In some embodiments, certain elements or modules of system 800 can perform various procedures, processes, and/or acts. In other embodiments, the procedures, processes, and/or acts can be performed by other suitable elements or modules. As an example, system 800 can be implemented using computer system 100 (FIG. 1).

Returning to FIG. 8, in a number of embodiments, system 800 can include feature set producing module 802. In certain embodiments, feature set producing module 802 can perform block 302 (FIG. 3) of producing a feature set.

In some embodiments, system 800 also can include a UGC analysis module 804. In certain embodiments, UGC analysis module 804 can perform block 304 (FIG. 3) of analyzing UGC to find mentions of each feature.

In various embodiments, system 800 further can include a total polarity determination module 806. In certain embodiments, total polarity determination module 806 can perform block 306 (FIG. 3) of determining total polarity by analyzing mentions.

In various embodiments, system 800 additionally can include feature score calculation module 808. In certain embodiments, feature score calculation module 808 can perform block 308 (FIG. 3) of presenting search results to the requester.

In various embodiments, order system 800 additionally can include final feature score calculation module 810. In certain embodiments, final feature score calculation module 810 can perform block 310 (FIG. 3) of calculating a final feature score.

In various embodiments, order system 800 additionally can include feature score display module 812. In certain embodiments, feature score display module 812 can perform block 312 (FIG. 3) of displaying feature scores to a user.

In various embodiments, order system 800 additionally can include order receiving module 814. In certain embodiments, order receiving module 814 can perform block 314 (FIG. 3) of receiving an order from a user.

In various embodiments, order system 800 additionally can include delivery facilitation module 816. In certain embodiments, delivery facilitation module 816 can perform block 316 (FIG. 3) of facilitating the delivery of the product to a user.

There can be several advantages to the systems and methods described above.

For example, another dimension is added to reviews. Annotating the reviews with relevant features of the product makes the reviews more readable for users. Thus, information is more accessible to users as the user can read only the reviews that discuss the features of interest to him/her.

Another advantage is the ability to use vertical scoring. Instead of there being a single rating for the overall review where the single rating might not accurately reflect what is important to some users, an analysis of features talked about in the review can be obtained. Providing a feature score goes beyond product scoring. Features can be highlighted depending upon good or bad sentiment expressed and feature scores of different products can help in comparing the products using only a single rating.

Another advantage is that this method can be used for any textual content. This approach can be enhanced and tuned to work with other textual contents to present sentiment expressed corresponding to various issues related to the content.

Another advantage is the ability to monetize the data. For example, an eCommerce provider can determine the best and most popular feature of a product from the calculated feature scores and use those features as a selling point or a badge for the product to highlight it. The eCommerce provider can sell information for specific products and/or general product categories to product designers and manufacturers.

As disclosed above, there can be methods and systems to calculate a feature score for every feature of a product. The feature score can be used to annotate reviews for which the feature score is not equal to zero. If a feature has either a positive feature score or a negative feature score, the implication is that the review mentions that particular feature. It is also possible for a review to have a neutral feature score even if the feature is mentioned in the review. For example, a review can mention a certain feature twice, once with a positive connotation and once with a negative connotation. There are a variety of different ways in which such a situation can be handled. In some embodiments, all feature scores that are zero can be ignored. In some embodiments, all mentions of a feature can be displayed. In such a manner, if a particular review mentions a feature, that mention can be indicated even if the feature score for that feature is zero.

For a (feature, review) pair with a feature score that is less than zero, the implication is that the feature has been mentioned negatively in the review, so that particular (feature, review) pair can be marked as "Bad."

For a (feature, review) pair with a feature score that is greater than zero, the implication is that the feature has been mentioned positively in the review, so that particular (feature, review) pair can be marked as "Good."

The scale used to determine if a pair is "Bad" or "Good" can range between any two numbers. In some embodiments, the feature score can range between −1 and 1. In other embodiments, the feature score can range between 0 and 10. In other embodiments, the feature score can range between 1 and 100. An embodiment can readily convert from one polarity scale to a different polarity scale through the use of addition, subtraction, multiplication, division, and the like. In addition, the threshold score being used to determine if a score is "Bad" or "Good" can be changed depending a user's desires. In some embodiments, the threshold score can be changed by a user on a website. In some embodiments, the threshold score is not changeable by a typical user. For example, in some embodiments where the feature scores range between −1 and 1, a score can be considered "good" if the score is over 0, while a score can be considered "bad" if the score is 0 or below. In some embodiments where the feature scores range between −1 and 1, a score can be considered "good" if the score is over 0.2, while a score of −0.2 or less can be considered "bad," with scores between −0.2 and 0.2 not being considered "good" or "bad." Other scores could also be used as a threshold score for determining if a review is "good," "bad," or "neutral."

Figure 9:
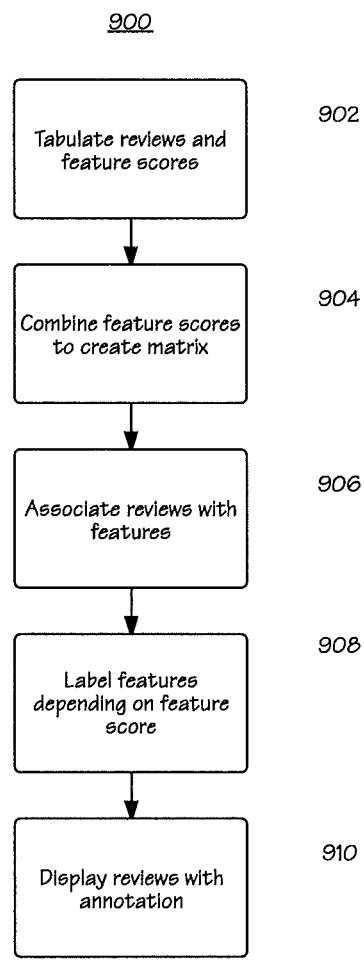
FIG. 9 is a flowchart illustrating a method for annotating reviews.

With reference to FIG. 9, a flowchart illustrating a method 900 for annotating reviews is presented. The review annotation can be performed on a computer system such as computer system 100 (FIG. 1). Method 900 is merely exemplary and is not limited to the embodiments presented herein. Method 900 can be employed in many different embodiments or examples not specifically depicted or described herein. In some embodiments, the procedures, the processes and/or the activities of method 900 can be performed in the order presented. In other embodiments, the procedures, the processes, and/or the activities of method 900 can be performed in any other suitable order. In still other embodiments, one or more of the procedures, the processes, and/or the activities of method 900 can be combined or skipped.

In one embodiment, after feature scores are obtained (using, for example, a method described above), one would tabulate each review and each feature score in that review (block 902). There can be a set of n reviews: $R_1, R_2, \ldots, R_n$. There can be a feature set of m features: $f_1, f_2, \ldots, f_m$. Each of the m features can have a feature score, established in a manner such as that set forth above.

The reviews and feature sets can be combined to form a two-dimensional matrix (block 904): $\{S_{11}, S_{12}, \ldots, S_{1N}; S_{21}, S_{22}, \ldots, S_{2N}; \ldots; S_{M1}, S_{M2}, \ldots, S_{MN}\}$.

Thereafter, the reviews are associated with features (block 906). For example, review $R_1$, has features $f_1, f_2$, and $f_4$ that have feature scores that are not equal to zero. Then $R_1$ gets associated with $f_1, f_2$, and $f_4$. In other words, each review is matched with the features that are discussed in the review.

Thereafter, the features are labeled depending on the feature score (block 908). Features with a feature score greater than a given threshold score (e.g., zero), can get marked as "Good." And the features with a feature score less than a given threshold score (e.g., zero), can get marked as "Bad." Then the reviews can be displayed to the user with a tag indicating the feature and whether the feature score was "Good" or "Bad" (block 910). Displaying a review to the User can involve transmitting data to a user's computer that cause the user's computer to display reviews.

There are several different advantages of such a method. For example, the above-presented annotation of reviews can help make the reviews more readable to a user. In addition, an embodiment can lead to a display of reviews that is more informative. A user is able to focus only on reviews that concern features of interest and ignore reviews that concern features with which he is not concerned.

There can also be a new layout/design to showcase customer reviews and information in reviews that can be difficult to find. Browsing customer reviews and other UGC can be as simple as viewing annotations of each review that note the attributes and features that each review discusses. Also, the sentiment of the author can be highlighted.

As discussed above, instead of displaying all the reviews as just large amounts of text in various pages, an embodiment annotates reviews with the features that each reviews discusses. In such a manner, a user can quickly determine what each review is discussing and what each review is about without the need to read the entire review.

With reference to FIG. 10, an exemplary screen shot 1000 is presented. FIG. 10 is merely exemplary and embodiments of the screen representation are not limited to the embodiments presented herein. The screen representation can be employed in many different embodiments or examples not specifically depicted or described herein.

Various aspects are present on screen 1000. Four reviews 1015, 1025, 1035, and 1045 are present in screen 1000. On a large eCommerce site, the most popular products can have thousands of reviews. Only a portion of the reviews might be visible at a time. In the illustration of FIG. 10, there happens to be four reviews. This is merely exemplary—there can be many more than four reviews present on a single screen, or there can be fewer than four reviews on a single screen.

The reviews in FIG. 10 are divided into two columns. Column 1010 contains a description of each review. In some embodiments, the description is entered by a user. For example, a user submitting a review, will often submit a title of the review. As described above, sometimes the title of the review is not pertinent to actual content of the review, making the title of the review not as useful as it could be. For example, review 1025 is titled, "disappointed." Such a title informs a user that the reviewer was not satisfied for some reason, but the user is left to guess at the reason. In another example, review 1045 is titled, "slow shipping." Such a title tells the user nothing about the product except that the delivery was slower than expected.

Column 1020 contains a list of "tags" that represent features that received either positive or negative feature scores in each review. In some embodiments, the tags can be color-coded. In such a manner, one color can represent positive feature scores and another color can represent negative feature scores. Instead of color coding, some embodiments can use other methods of indicating the difference between positive, negative, and neutral feature scores, such as shading, hatch marks, underlining, typeface, font colors, and the like.

The result is that, with a quick glance, a user can determine which reviews he wants to read more thoroughly—typically, those reviews that discuss a feature that is important to the user. For example, if a user is interested in a particular camera's flash performance, he would be able to tell at a glance that only reviews 1015 and 1035 are pertinent to him. In some embodiments, the user will be able to click on the title of the review to access the entirety of the review text, in a manner to be detailed below.

Figure 11:
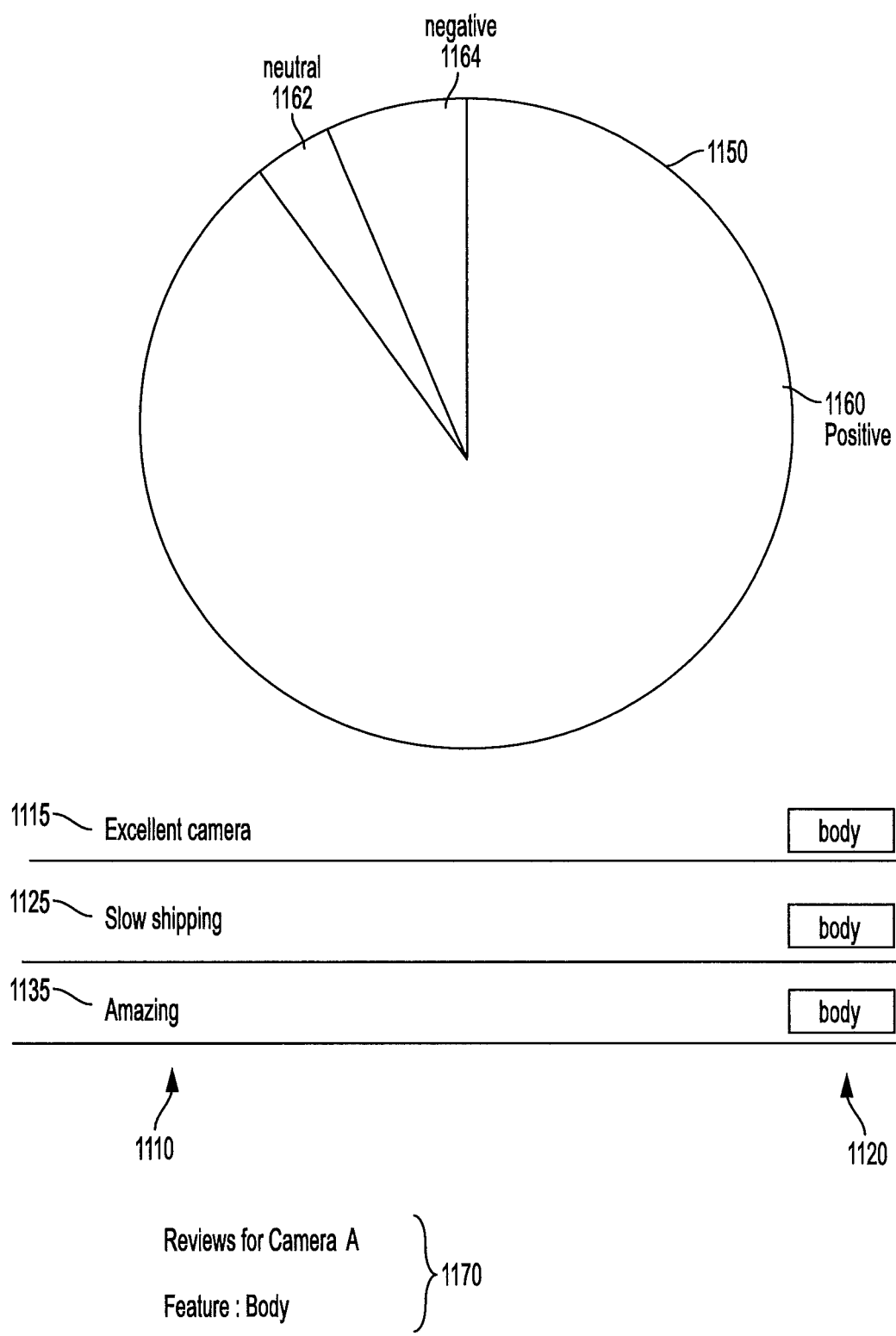
FIG. 11 is an exemplary screen shot according to an embodiment.

In some embodiments, a user is able to click on a tag to view only those reviews that contain features scores for that feature. Moving ahead to FIG. 11, a screen shot 1100 is presented. FIG. 11 is merely exemplary and embodiments of the screen representation are not limited to the embodiments presented herein. The screen representation can be employed in many different embodiments or examples not specifically depicted or described herein.

Screen 1100 illustrates a result of a user clicking on the "body" tag from screen 1000. Here, only reviews that have a non-zero feature score for the selected feature are presented to the user. It should be understood that it is also possible to present products with a feature score of zero to the user.

There can be a title 1170. The title 1170 can serve to remind the user as to which product and feature the reviews pertain. Such a feature can be handy because a user might have several browser windows or tabs open at once; if switching back and forth between reviews of different products, it can be useful to be reminded what the product and features the user is viewing. Reviews 1115, 1125, and 1135 are presented to the user. On a large eCommerce site, the most popular products can have thousands of reviews. Only a portion of the reviews might be visible at a time. In the illustration of FIG. 11, there happens to be three reviews. It should be understood that there can be many more than three reviews present on a single screen. In a similar manner to that described above, the reviews can contain two columns, column 1110 and column 1120. Column 1110 displays the title of the review. In some embodiments, only the tag that is the subject of the search is displayed to the user in column 1120. In some embodiments, all of the pertinent tags can be displayed to the user, to allow the user to view other feature scores. In some embodiments, instead of a tag being displayed in column 1120, because all of the reviews are relevant to a selected feature, an indication of whether the review is positive or negative can be contained in column 1120.

In some embodiments, the user is able to select on a review (such as by clicking on the review title in column 1110) to view an excerpt of the review, ranging up to the entire review. A user might wish to read an excerpt or the entire review to judge how reliable the reviewer is. In some embodiments, when the user selects a review to read, the text of the review, or an excerpt thereof, is displayed to the user. In addition, there can be elements of the review that can be highlighted, underlined, or otherwise distinguished from the remainder of the review. In the situation of FIG. 11, where each of the reviews are concerning the "body" feature of the product, the sentences of the review that contain a reference to the "body" feature can be highlighted, underlined, or otherwise distinguished. The methods used to perform such a feature are detailed below.

In addition to the list of reviews, there can also be a graphical indicia that represents the distribution of positive and negative features from the reviews. Pictured in FIG. 11 is a pie chart 1150. Pie chart 1150 can contain various segments, such as positive segment 1160, neutral segment 1162, and negative segment 1164. Each of these segments is configured to illustrate the percentage of reviews that contain a certain feature score. In FIG. 11, the vast majority of reviews that contain a feature score for "body" are positive, so positive segment 1160 is much larger than the other two segments. In some embodiments, there can be color-coding of the graphical indicia. For example, positive segment 1160 can be a first color, neutral segment 1162 can be a second color, and negative segment 1164 can be a third color. The color-coding can extend to the tags in column 1120. For example, a review that contained a positive feature score for "body" can be the same first color as positive segment 1160. In a similar manner, a review that contained a neutral feature score for "body" can be the same second color as neutral segment 1162 and a review that contained a negative feature score for "body" can be the same third color as negative segment 1164. While a pie chart is illustrated in FIG. 11, other embodiments can use other types of graphical indicia, such as bar graphs, line graphs, histograms, and the like.

The creation of the graphical indicia can be accomplished in a variety of different manners. In one embodiment, the number of reviews featuring a particular feature is known or can be determined through common database operations. The creation of a graphical representation can be accomplished by determining the total number of reviews with a particular feature, the number of positive reviews of that particular feature, the number of negative reviews of that particular feature, and the number of neutral reviews of that particular features.

Other graphical indicia can be created. In one embodiment, the number of reviews that discuss a particular feature can be compared to the total number of reviews of the product. In such a manner, a user can more easily determine how important a feature is to the reviews.

The above layout can be beneficial in the sense that it will have a huge impact on customer satisfaction. Given the clutter that is currently present over many customer review portals, an embodiment would provide a solution that would help in retaining old customers and attracting new customers. An embodiment can also lead to a customer spending more time on a particular site, which can lead to increased revenue generation for an eCommerce provider using an embodiment.

Products can have many features that a prospective purchaser might have to take into consideration before making a purchase. For example, a digital single lens reflex (DSLR) camera might have more than 50 features to consider before buying it. A person shopping for a DSLR might not know exactly what he needs and what features he should concentrate on. Even after knowing the features you should look into, it can still be desirable to read the reviews. The reviews can give an insight as to how well the features work, where the product excels, and where the product needs improvement.

It can be desirable to provide, to a user, a list of the most important features of a product. After performing a feature-based sentiment analysis on a set of features, as detailed above, the most important features of a product can be filtered out.

The filtering procedure can use heuristics to prioritize features based on popularity and bias of the features. If a feature if highly regarded, then its popularity increases. If the sentiment of a sentence is highly positive or highly negative, the sentence can be considered to be highly biased.

Figure 13:
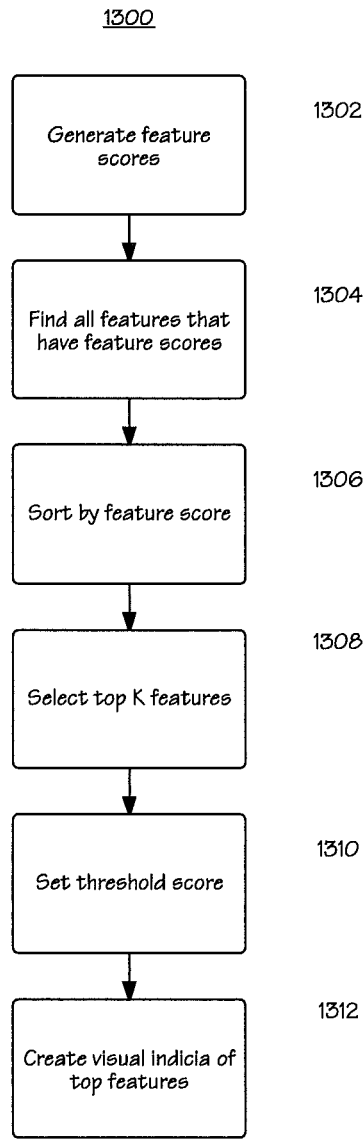
FIG. 13 is a flowchart illustrating a method for annotating reviews.

In the following embodiment, it is assumed that the range of feature scores is from 0 to 1. In other embodiments, a different range of scores can be used. In an embodiment where the range of feature scores is from 0 to 1, the feature ranking can be calculated as follows:

With reference to FIG. 13, a flowchart illustrating a method 1300 for annotating reviews is presented. The review annotation can be performed on a computer system such as computer system 100 (FIG. 1). Method 1300 is merely exemplary and is not limited to the embodiments presented herein. Method 1300 can be employed in many different embodiments or examples not specifically depicted or described herein. In some embodiments, the procedures, the processes and/or the activities of method 1300 can be performed in the order presented. In other embodiments, the procedures, the processes, and/or the activities of method 1300 can be performed in any other suitable order. In still other embodiments, one or more of the procedures, the processes, and/or the activities of method 1300 can be combined or skipped.

The normalized score ranges between 0 and 1. Feature scores are generated for every feature of a product, possibly by using a method described earlier in this specification (block 1302). In general, this process would involve analyzing each review, determining the features described in each review, and assigning a feature score to each feature in each review. Once all the reviews are analyzed, all of the features with feature scores are determined (block 1304). The features can be sorted in descending order of feature score (block 1306). Thereafter, the top K features can be selected (block 1308). K can be selected to be any number. As described above, some products can have more than 50 features. It might not be desirable to list all the features of a product, as the list can be too long. Therefore, only a certain, predetermined number K can be chosen. In some embodiments, the top K features can be restricted by setting a minimum threshold score T (block 1310). For example, because the normalized feature scores range from 0 (bad) to 1 (good), a threshold score of 0.5 can be set. Thereafter, if only 5 features have a feature score of 0.5, only those 5 features are displayed to the user. It should be understood that the values of K and T can be fine-tuned depending on the desired results.

In some embodiments, after selecting the features, a visual indicia of the top features can be created (block 1312). In some embodiment, the visual indicia can be a tag cloud. A tag cloud is a visual representation of data, in this case, of features. The importance of each feature is shown by various features, such as font size and color. An exemplary tag cloud is shown in FIG. 14.

Figure 14:
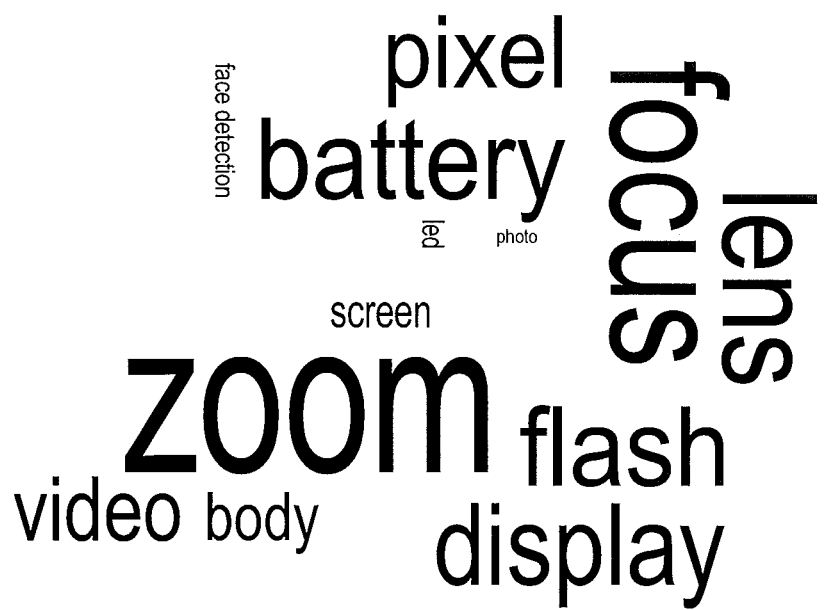
FIG. 14 is an exemplary screen shot according to an embodiment.

Moving ahead to FIG. 14, a screen shot 1400 is presented. FIG. 14 is merely exemplary and embodiments of the screen representation are not limited to the embodiments presented herein. The screen representation can be employed in many different embodiments or examples not specifically depicted or described herein.

Screen shot 1400 displays a portion of an exemplary display. The data used to create screen shot 1400 can be transmitted to a user's computer, tablet, smartphone, or other similar device along with instructions to the user's computer, tablet, smartphone, or other similar device that can be arranged to cause the device to display screen shot 1400.

Screen shot 1400 contains tag cloud 1450. There can be other elements present in screen shot 1400, but only tag cloud 1450 is shown for illustrative purposes. In this example, tag cloud 1450 includes each of the K features of an exemplary camera that have a feature score over threshold T. As is typical in a tag cloud, tag cloud 1450 displays each of the features with a different font size to differentiate between the features. In this case, the features of tag cloud 1450 are distinguished by the feature score of each feature—the higher the feature score, the larger the font size of the feature.

Tag cloud 1450 contains 12 different features: face detection, pixel, battery, LCD (liquid crystal display), photo, screen, zoom, video, body, focus, lens, flash, and display. The features are sized and/or colored to visually illustrate the score of the feature. For example, the feature "zoom" has the largest font size, and therefore has the highest feature score of any of the features. In contrast, the feature "lcd" has the smallest font size, and therefore has the lowest feature score over threshold T.

In some embodiments, the size of the font can instead be used to illustrate the number of reviews with that feature and the color of the font can be used to illustrate the feature score. For example, there can be features with similar font sizes (for example, lens and focus in FIG. 14). In such a case, the color of the words can be used to distinguish which feature has a higher feature score. A legend can be provided to aid a viewer in determining that, for example, the more green a font color is, the more higher the feature score, while the more red a font color is, the lower the feature score is.

Figure 15:
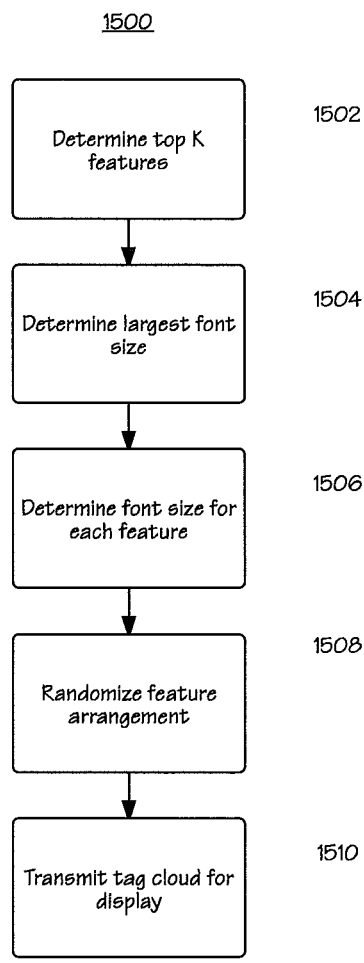
FIG. 15 is a flowchart illustrating a method for creating a tag cloud.

With reference to FIG. 15, a flowchart illustrating a method 1500 for creating a tag cloud based on reviews is presented. Method 1500 can be performed on a computer system such as computer system 100 (FIG. 1). Method 1500 is merely exemplary and is not limited to the embodiments presented herein. Method 1500 can be employed in many different embodiments or examples not specifically depicted or described herein. In some embodiments, the procedures, the processes and/or the activities of method 1500 can be performed in the order presented. In other embodiments, the procedures, the processes, and/or the activities of method 1500 can be performed in any other suitable order. In still other embodiments, one or more of the procedures, the processes, and/or the activities of method 1500 can be combined or skipped.

The elements of method 1500 can be performed after block 1312 of FIG. 13. However, the elements of method 1500 can also be performed independently or as a part of a different method. With reference to FIG. 15, the top K features and their feature scores are sorted by feature score (block 1502). As stated above, the tag cloud can be based on various aspects of reviews. The embodiment illustrated in FIG. 15 will use feature score. However, other embodiments, can use other aspects, such as number of reviews.

The top K features can be determined in one of a variety of different manners. Assuming the polarity scores range from 0 (for lowest rating) to 1 (for the highest rating), in one embodiment, the sum of the polarity scores can be used to create an unnormalized score. In some embodiments, this value can be the sum of the maximum of the polarity and 1 minus the polarity, such that the lowest reviews of a feature are captured along with the highest reviews of a feature. In other words, a user might not be interested in just positive reviews of a certain feature. The user also wants to know what people score a feature in a negative manner. The polarity ranges from 0 to 1. Using both the polarity score and 1—the polarity score ensures that a feature score of 0.8 is treated in the same manner as a feature score of 0.2.

Thereafter, the unnormalized scores can be normalized. In one embodiment, each unnormalized score can be determined by taking the unnormalized score, subtracting the smallest unnormalized score, and dividing the result by the highest unnormalized score.

After being sorted by normalized score, the largest font size F is determined (block 1504). In some embodiments, the largest font size is dependent on the medium by which the font will be displayed. For example, an embodiment being displayed on a mobile device might have a different largest font size than an embodiment being displayed on a desktop device.

Thereafter, using the number K of features to be tagged and, the font size of each of the features is determined (block 1506). In some embodiments, the font size can be distributed linearly. In some embodiments, the font size can be distributed logarithmically.

In an embodiment where the font size is distributed linearly, the feature with the highest feature score is chosen to have the largest font size F. The feature with the second highest feature score is chosen to have the font size (K−1/K)*F. The feature with the third highest feature score is chosen to have the font size (K−2/K)*F. And so on until the feature with the Kth lowest feature score has the font size (1/K)*F. In some embodiments, the font size is chosen by proportionally scaling the "normalized feature score" between a range of font sizes between a minimum font size and a maximum font size. In some embodiments, the minimum font size is approximately 5 points and the maximum font size is approximately 72 points. Other font sizes can be used in other embodiments.

After the font sizes are chosen, the features are arranged in a random order (block 1508). Thereafter, the random arrangement of features in different font sizes is transmitted to a user for display (block 1510).

In some embodiments, the tag cloud can be configured to be clickable. A user can click on one of the features listed in the tag cloud and be shown a list of reviews featuring that feature (such as the bottom portion of screen shot 1100 of FIG. 11). The tag cloud can be made clickable in one of a variety of ways known in the art. For example, an image map can be created based on the random arrangement of features and font sizes. Thereafter, the image map can be laid over the tag cloud in such a manner that clicking on an area of the tag cloud results in clicking an area of the image map corresponding to the clicked area of the tag cloud. For example, with respect to FIG. 14, when a user clicks on the area corresponding to "zoom," the coordinates of the area being clicked are s corresponding area of the image map. The image map has a set of coordinates that correspond to each feature.

In another aspect, an embodiment can help a user to understand a special aspect of a set of reviews. Given an aspect and content in which a user is interested, the content can be annotated with sentiment and highlights. If the user is interested in acquiring knowledge about a specific aspect from multiple contents, a visualization of the content can be a great help to the user. The sentiment of the content also the sentiment related to the specific aspect.

Referring back to FIG. 11, pie chart 1150 shows the distribution of different sentiment in the reviews. Different reviews along with their sentiment are listed. On clicking a specific review, an annotated version of the full review expands. The result is shown in FIG. 12.

Figure 12:
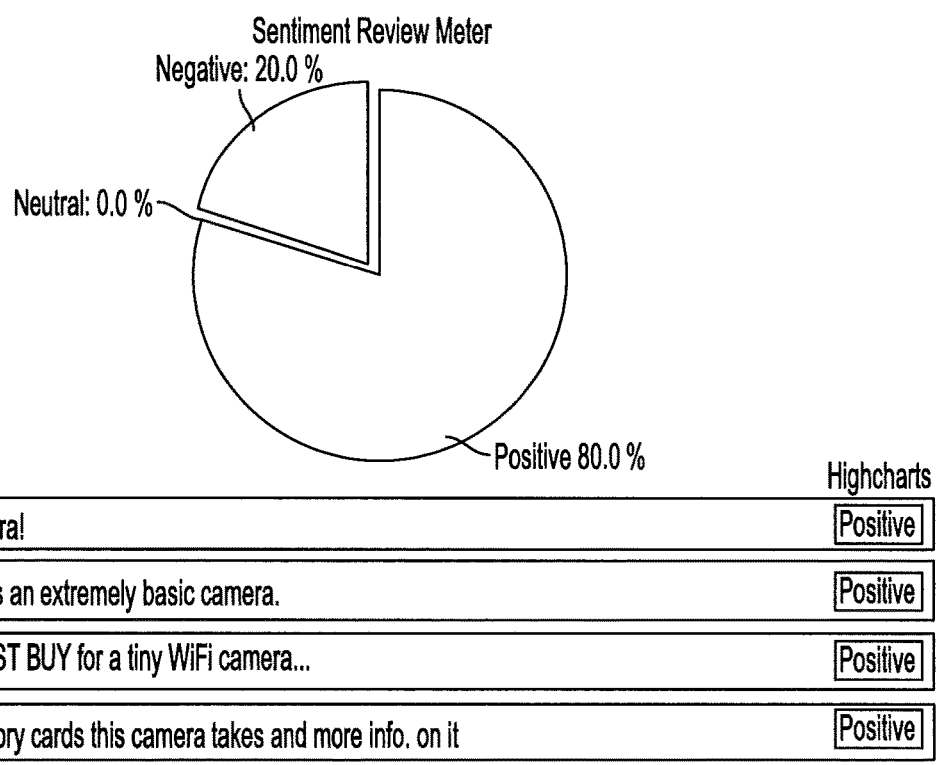
FIG. 12 is an exemplary screen shot according to an embodiment.

In FIG. 12, we can see that the "Zoom" feature has positive, negative, and neutral reviews. These reviews can be highlighted in different colors to indicate the different categories. Such highlighting can help the user determine the sentences of the reviews that he can concentrate upon. It should be understood that the highlighting can use three different colors, three different types of underlining, or any types of techniques that can be used to distinguish between differences in reviews. In addition, other numbers of colors, underlining, or highlighting can be used. In some embodiments, only two different colors, underlining, or highlighting can be used, with neutral reviews being uncolored. In some embodiments, only one color, underlining, or highlighting is used. In some embodiments, a user can select how many different color, underlining, or highlighting is used and can select which sentences (good, bad, or neutral) get colored, underlined, or highlighted.

Figure 16:
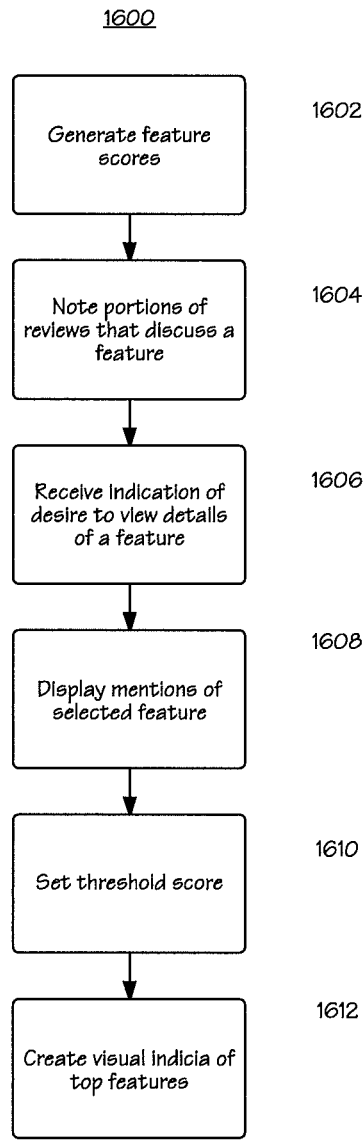
FIG. 16 is a block diagram of a system arranged to perform various tasks according to an embodiment.

With reference to FIG. 16, a flowchart illustrating a method 1600 for displaying annotated reviews is presented. The review annotation can be performed on a computer system such as computer system 100 (FIG. 1). Method 1600 is merely exemplary and is not limited to the embodiments presented herein. Method 1600 can be employed in many different embodiments or examples not specifically depicted or described herein. In some embodiments, the procedures, the processes and/or the activities of method 1600 can be performed in the order presented. In other embodiments, the procedures, the processes, and/or the activities of method 1600 can be performed in any other suitable order. In still other embodiments, one or more of the procedures, the processes, and/or the activities of method 1600 can be combined or skipped.

Each review is analyzed and a feature score is generated for every feature of a product, possibly using a method described earlier in this specification. Feature scores are generated for every feature of a product, possibly by using a method described earlier in this specification (block 1602). In general, this process would involve analyzing each review, determining the features described in each review, and assigning a feature score to each feature in each review. Instead of merely assigning a feature score for each feature in each review, each portion of the review that mentions a feature is noted, such that every mention of every feature has a notation in a database (block 1604). For example, a review that mentions both the features "body" and "zoom" would be marked with both of those features. However, in addition, the sentence or sentences in each review that mention "body" or "zoom" would be noted.

Thereafter, an embodiment can receive input from a user indicating a desire to view details about a certain feature (block 1606). A graphical indicia of the reviews can be displayed to the user, along with one or more reviews, as illustrated above with respect to FIG. 11. As described above, a pie chart or other graphical indicia can be used to illustrate the distribution between positive reviews, negative reviews, and neutral reviews.

As shown in FIG. 11, a summary sentence is displayed to the user, along with an indication of whether the review was positive or negative. The user can then click on one of the reviews, resulting in the summary shown in FIG. 12.

The entire review is now shown to the user as element 1240. Along with the display of the review individual sentences of the review are highlighted. For example, element 1242 shows a sentence discussing the feature in a negative manner. Element 1244 shows a sentence discussing the same feature in a neutral manner. Element 1246 shows a sentence discussing the same feature in a positive manner.

Continuing to FIG. 16, the creation of such a display can be discussed. The database containing the reviews is consulted. The score of each mention of each feature is accessed to determine if the mention is positive, negative, or neutral. Thereafter, the mention is displayed in a different manner depending on the mention (block 1608).

In some database systems, the review portion would be stored in a single field. Thus, even a 1000-word (or longer) review would be contained in a single field. In some embodiments, the review can be parsed, then stored in a plurality of fields in a database. For example, each sentence can be stored in a separate field. Also stored in a separate field is the feature that the sentence discusses. In such a manner, as each sentence of a review is displayed, special formatting can be applied to each sentence, depending on the content of the sentence. When the text of a review is to be displayed, each sentence can be retrieved individually. Then, the field indicating which feature is discussed by the sentence is accessed to determine if the sentence should be emphasized in some way. If the user requested reviews regarding the feature "lens," a sentence discussing the "flash" will not receive emphasis. But a sentence discussing "lens" will receive emphasis. As described above, the emphasis could be underlining, font color, highlighting, and the like. This process of retrieving a sentence and applying an emphasis can be repeated for each sentence in the review.

Although the above embodiments have been described with reference to specific embodiments, it will be understood by those skilled in the art that various changes might be made without departing from the spirit or scope of the disclosure. Accordingly, the disclosure of embodiments is intended to be illustrative of the scope of the disclosure and is not intended to be limiting. It is intended that the scope of the disclosure shall be limited only to the extent required by the appended claims. For example, to one of ordinary skill in the art, it will be readily apparent that any element of FIGS. 1-16 can be modified, and that the foregoing discussion of certain of these embodiments does not necessarily represent a complete description of all possible embodiments. For example, one or more of the procedures, processes, or activities of FIGS. 1-16 can include different procedures, processes, and/or activities and be performed by many different modules, in many different orders.

All elements claimed in any particular claim are essential to the embodiment claimed in that particular claim. Consequently, replacement of one or more claimed elements constitutes reconstruction and not repair. Additionally, benefits, other advantages, and solutions to problems have been described with regard to specific embodiments. The benefits, advantages, solutions to problems, and any element or elements that can cause any benefit, advantage, or solution to occur or become more pronounced, however, are not to be construed as critical, required, or essential features or elements of any or all of the claims, unless such benefits, advantages, solutions, or elements are stated in such claim.

Moreover, embodiments and limitations disclosed herein are not dedicated to the public under the doctrine of dedication if the embodiments and/or limitations: (1) are not expressly claimed in the claims; and (2) are or are potentially equivalents of express elements and/or limitations in the claims under the doctrine of equivalents.

What is claimed is:

1. A method comprising:
  analyzing one or more reviews in a set of reviews to determine a set of features;
  determining a respective feature score for each respective feature of the set of features analyzed in the one or more reviews;
  matching the set of features with the set of reviews to create an annotated set of reviews, wherein each respective review in the annotated set of reviews is matched with one or more respective annotations;
  for each respective annotation in each respective review in the annotated set of reviews, marking one or more respective annotations as positive for the respective feature when the respective feature score of the respective feature is greater than a first predetermined score;
  for each respective annotation in each respective review in the annotated set of reviews, marking one or more respective annotations as negative for the respective feature when the respective feature score of the respective feature is less than a second predetermined score;
  determining a respective total polarity for each respective feature in the set of features using:
    marks of positive reviews in the annotated set of reviews;
    marks of negative reviews in the annotated set of reviews;
    marks of neutral reviews in the annotated set of reviews; and
    a respective number of times each respective feature of the set of features was referenced in each review of the annotated set of reviews;
  in response to receiving a user request, facilitating displaying an overview page comprising:
    an overall score for a plurality of similar items described in the one or more reviews, each item of the plurality of similar items having at least one respective feature of the set of features and the overall score determined by user voting; and
    one or more display options for displaying one or more graphical indicias of consumer sentiment;
  in response to a first user selection of a first display option on the overview page, facilitating displaying:
    a pie chart displaying:
      a percentage of the positive reviews in the annotated set of reviews for the at least one respective feature;
      a percentage of the negative reviews in the annotated set of reviews for the at least one respective feature; and
      a percentage of the neutral reviews in the annotated set of reviews for the at least one respective feature; and
  in response to a second user selection of a second display option on the overview page, facilitating displaying:
    a table located underneath the pie chart, wherein the table is configured to, in response to a selection of a respective portion of the pie chart, display a respective snippet of a set of snippets of:
      the positive reviews in the annotated set of reviews for the at least one respective feature, the positive reviews having a positive feature score above a positive review predetermined threshold score;

the negative reviews in the annotated set of reviews for the at least one respective feature, the negative reviews having a negative feature score above a negative review predetermined threshold score; or
the neutral reviews in the annotated set of reviews for the at least one respective feature, the neutral reviews having a neutral feature score above a neutral review predetermined threshold score; and
at least one respective selectable element for each respective snippet of the set of snippets, the at least one respective selectable element configured to, when selected, navigate an electronic device of a user to a display of a respective review of the annotated set of reviews, the respective review describing the at least one respective feature corresponding to the at least one respective selectable element, as selected, wherein:
each feature of the set of features represents a different aspect of a product being reviewed.

2. The method of claim 1, wherein:
the method further comprises:
for each respective annotation in each respective review in the annotated set of reviews, marking one or more respective annotations as neutral for the respective feature when the respective feature score of the respective feature is between or equal to the first predetermined score and the second predetermined score.

3. The method of claim 1, wherein:
the first predetermined score is equal to the second predetermined score.

4. The method of claim 1 wherein the respective review of the annotated set of reviews comprises:
a title associated with at least one review of the annotated set of reviews;
the at least one respective feature associated with the title;
a first indicia when the at least one respective feature has a positive annotation; and
a second indicia when the at least one respective feature has a negative annotation.

5. The method of claim 4 wherein
the method further comprises:
for each respective annotation in each respective review in the annotated set of reviews, marking one or more respective annotations as neutral for the respective feature when the respective feature score of the respective feature is between or equal to the first predetermined score and the second predetermined score; and
the at least one review of the annotated set of reviews further comprises a third indicia when a feature has a neutral annotation.

6. The method of claim 5 wherein the first indicia, the second indicia, and the third indicia are differentiated by color.

7. The method of claim 5 wherein the first indicia, the second indicia, and the third indicia are differentiated by underlining.

8. The method of claim 1 further comprising:
in response to a third user selection of a third display option on the overview page, facilitating displaying a bar graph displaying:
a first feature score for the positive reviews in the annotated set of reviews for the at least one respective feature;
a second feature score for the negative reviews in the annotated set of reviews for the at least one respective feature; and
a third feature score for the neutral reviews in the annotated set of reviews for the at least one respective feature.

9. The method of claim 1 wherein determining the respective feature score for each respective feature of the set of features comprises calculating the respective feature score using:

$$\text{feature score}(f_i, R_j) = S_{ij} = \Sigma_{k=1}^{n_{ij}} s_k, \text{ where:}$$

$f_i$ comprises a respective feature of the set of features;
$R_j$ comprises a review of the set of reviews;
$S_{ij}$ comprises the respective feature score;
$n_{ij}$ comprises a number of mentions in the review of the set of reviews for a respective feature;
$s_k$ comprises a polarity of each respective mention of the mentions; and
k comprises each respective mention of the mentions.

10. The method of claim 1 wherein:
a first color of the percentage of the positive reviews in the pie chart is identical to a first text color of the respective snippet of the positive reviews;
a second color of the percentage of the negative reviews in the pie chart is identical to a second text color of the respective snippet of the negative reviews; and
a third text color of the percentage of the neutral reviews in the pie chart is identical to a third text color of the respective snippet of the neutral reviews.

11. A system comprising:
one or more processors; and
one or more non-transitory storage devices storing computing instructions configured to run on the one or more processors and perform:
analyzing one or more reviews in a set of reviews to determine a set of features;
determining a respective feature score for each respective feature of the set of features analyzed in the one or more reviews;
matching the set of features with the set of reviews to create an annotated set of reviews, wherein each respective review in the annotated set of reviews is matched with one or more respective annotations;
for each respective annotation in each respective review in the annotated set of reviews, marking one or more respective annotations as positive for the respective feature when the respective feature score of the respective feature is greater than a first predetermined score;
for each respective annotation in each respective review in the annotated set of reviews, marking one or more respective annotations as negative for the respective feature when the respective feature score of the respective feature is less than a second predetermined score;
determining a respective total polarity for each respective feature in the set of features using:
marks of positive reviews in the annotated set of reviews;
marks of negative reviews in the annotated set of reviews;
marks of neutral reviews in the annotated set of reviews; and
a respective number of times each respective feature of the set of features was referenced in each review of the annotated set of reviews;

in response to receiving a user request, facilitating displaying an overview page comprising:
  an overall score for a plurality of similar items described in the one or more reviews, each item of the plurality of similar items having at least one respective feature of the set of features and the overall score determined by user voting; and
  one or more display options for displaying one or more graphical indicias of consumer sentiment;
in response to a first user selection of a first display option on the overview page, facilitating displaying:
  a pie chart displaying:
    a percentage of the positive reviews in the annotated set of reviews for the at least one respective feature;
    a percentage of the negative reviews in the annotated set of reviews for the at least one respective feature; and
    a percentage of the neutral reviews in the annotated set of reviews for the at least one respective feature; and
in response to a second user selection of a second display option on the overview page, facilitating displaying:
  a table located underneath the pie chart, wherein the table is configured to, in response to a selection of a respective portion of the pie chart, display a respective snippet of a set of snippets of:
    the positive reviews in the annotated set of reviews for the at least one respective feature, the positive reviews having a positive feature score above a positive review predetermined threshold score;
    the negative reviews in the annotated set of reviews for the at least one respective feature, the negative reviews having a negative feature score above a negative review predetermined threshold score; or
    the neutral reviews in the annotated set of reviews for the at least one respective feature, the neutral reviews having a neutral feature score above a neutral review predetermined threshold score; and
  at least one respective selectable element for each respective snippet of the set of snippets, the at least one respective selectable element configured to, when selected, navigate an electronic device of a user to a display of a respective review of the annotated set of reviews, the respective review describing the at least one respective feature corresponding to the at least one respective selectable element, as selected, wherein:
    each feature of the set of features represents a different aspect of a product being reviewed.

12. The system of claim 11 wherein:
the computing instructions are further configured to perform:
  for each respective annotation in each respective review in the annotated set of reviews, marking one or more respective annotations as neutral for the respective feature when the respective feature score of the respective feature is between or equal to the first predetermined score and the second predetermined score.

13. The system of claim 11 wherein:
the first predetermined score is equal to the second predetermined score.

14. The system of claim 11 wherein the respective snippet of the respective review of the annotated set of reviews comprises:
  a title associated with at least one review of the annotated set of reviews;
  the at least one respective feature associated with the title;
  a first indicia when the at least one respective feature has a positive annotation; and
  a second indicia when the at least one respective feature has a negative annotation.

15. The system of claim 14 wherein:
the computing instructions are further configured to perform:
  for each respective annotation in each respective review in the annotated set of reviews, marking one or more respective annotations as neutral for the respective feature when the respective feature score of the respective feature is between or equal to the first predetermined score and the second predetermined score; and
the at least one review of the annotated set of reviews further comprises a third indicia when a feature has a neutral annotation.

16. The system of claim 15 wherein the first indicia, the second indicia, and the third indicia are differentiated by color.

17. The system of claim 15 wherein the first indicia, the second indicia, and the third indicia are differentiated by underlining.

18. The system of claim 11 wherein the computing instructions are further configured to perform:
  in response to a third user selection of a third display option on the overview page, facilitating displaying a bar graph displaying:
    a number of the positive reviews in the annotated set of reviews for the at least one respective feature;
    a number of the negative reviews in the annotated set of reviews for the at least one respective feature; and
    a number of the neutral reviews in the annotated set of reviews for the at least one respective feature.

19. The system of claim 11 wherein determining the respective feature score for each respective feature of the set of features comprises calculating the respective feature score using:

$$\text{feature score}(f_i, R_j) = S_{ij} = \sum_{k=1}^{n_{ij}} s_k, \text{ where:}$$

$f_i$ comprises a respective feature of the set of features;
  $R_j$ comprises a review of the set of reviews;
  $S_{ij}$ comprises the respective feature score;
  $n_{ij}$ comprises a number of mentions in the review of the set of reviews for a respective feature;
  $s_k$ comprises a polarity of each respective mention of the mentions; and
  k comprises each respective mention of the mentions.

20. The system of claim 11, wherein:
  a first color of the percentage of the positive reviews in the pie chart is identical to a first text color of the respective snippet of the positive reviews;
  a second color of the percentage of the negative reviews in the pie chart is identical to a second text color of the respective snippet of the negative reviews; and
  a third text color of the percentage of the neutral reviews in the pie chart is identical to a third text color of the respective snippet of the neutral reviews.

* * * * *